April 6, 1954
R. C. STEELE ET AL
2,674,295
METHOD OF AND MEANS FOR EXPANDING
EXPANSIBLE CELLULAR MATERIAL
Filed Dec. 13, 1950
2 Sheets-Sheet 1
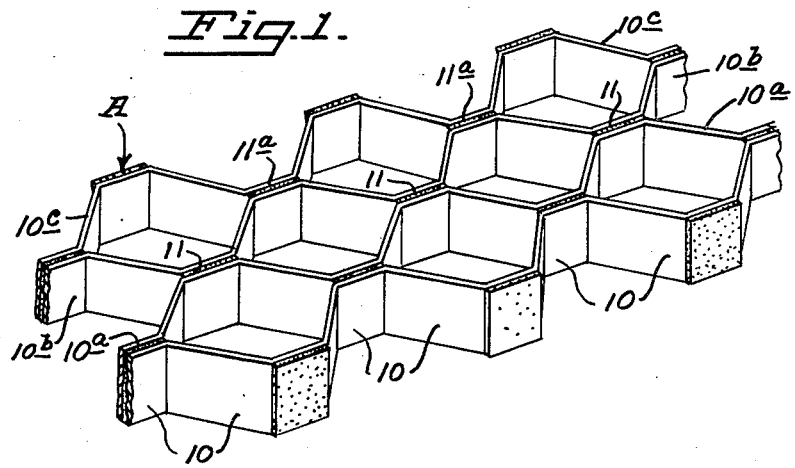
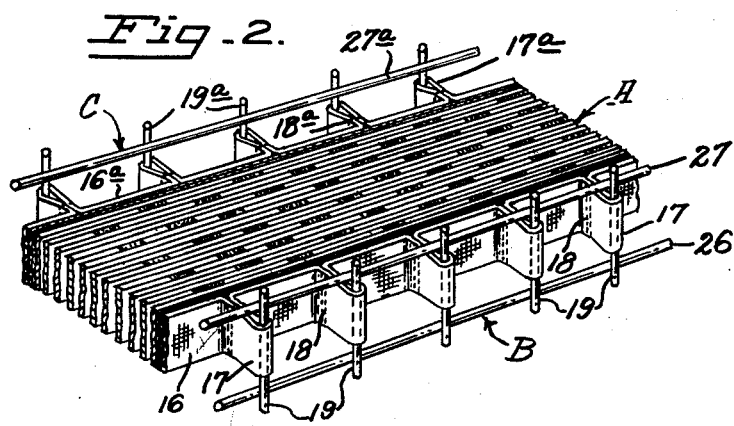
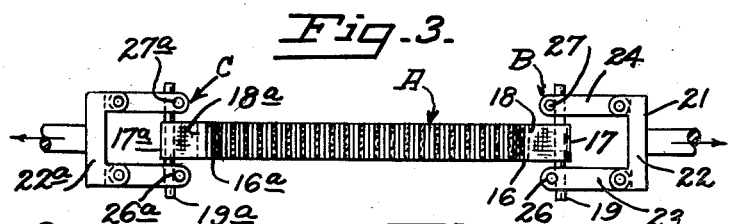
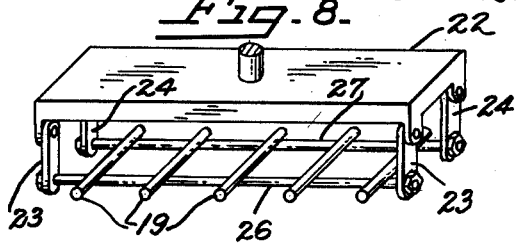
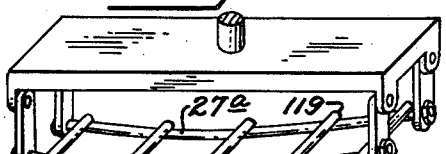
INVENTORS
ROGER C. STEELE
PAUL V. AMMEN
BY
Townsend and Townsend
ATTORNEYS April 6, 1954
R. C. STEELE ET AL
2,674,295
METHOD OF AND MEANS FOR EXPANDING EXPANSIBLE CELLULAR MATERIAL
Filed Dec. 13, 1950
2 Sheets-Sheet 2
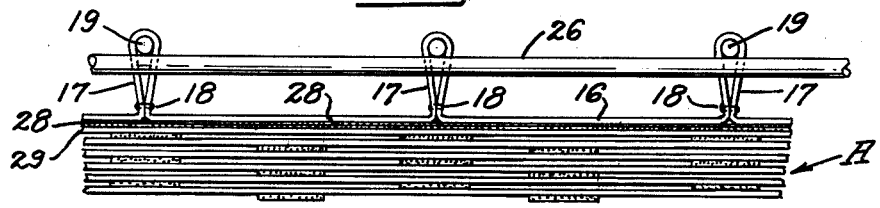
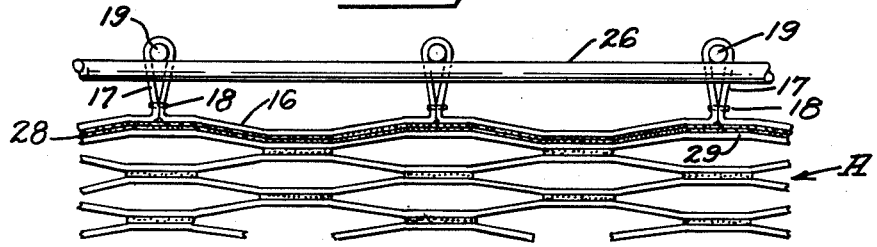
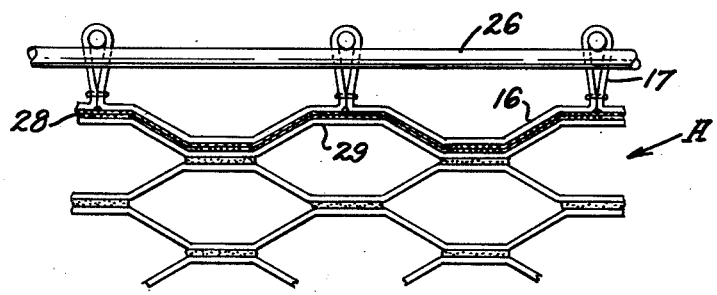
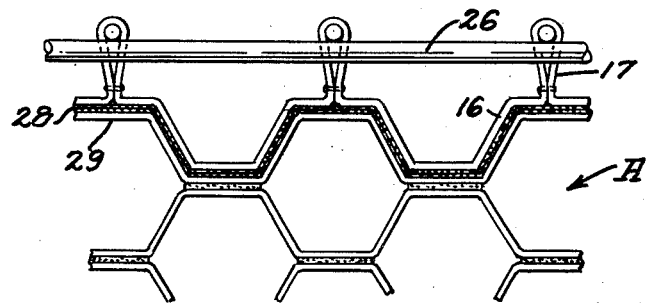
INVENTORS
ROGER C. STEELE
PAUL V AMMEN
BY
Townsend and Townsend
ATTORNEYS

Patented Apr. 6, 1954

2,674,295

UNITED STATES PATENT OFFICE 2,674,295

METHOD OF AND MEANS FOR EXPANDING EXPANSIBLE CELLULAR MATERIAL

Roger C. Steele, Albany, and Paul V. Ammen, Orinda, Calif., assignors to California Reinforced Plastics Company, Berkeley, Calif., a corporation of California Application December 13, 1950, Serial No. 200,532

30 Claims. (Cl. 154—1)

This invention relates to a method of and means for expanding blocks of structural cellular material, such as honeycomb core material.

It is contemplated that the present invention will have particular utility in the art of expanding that type of cellular material known in the trade as "honeycomb" or "honeycomb core," although it is understood that the scope of the present invention is not limited to use with any particular type of expandable cellular material. However, for purposes of brevity and simplicity of discussion, the present invention will be described with particular relation to honeycomb core.

In U. S. Letters Patent No. 2,610,934, there is illustrated and described a method of and machine for producing honeycomb core by the expansion process. Briefly, the application discloses how honeycomb may be produced by applying to opposite sides of an elongated web or sheet of material alternately spaced or staggered glue lines. By lapping the glued sheet back and forth over itself, a stack of superposed layers of the material can be built up, and a stack thus formed may be sliced transversely to the glue lines to form one or more blocks or slices of unexpanded honeycomb. It is in connection with the expansion of unexpanded slices or blocks of honeycomb of this latter type that the present invention particularly relates.

A principal object of the present invention is to teach a method of, and provide a means for, expanding an unexpanded block of expandable cellular material, such as, honeycomb, by applying uniform expansion forces to opposite end webs of the block at a plurality of substantially equidistantly spaced points throughout the respective lengths of each end web of the material.

In expanding honeycomb, if more expansion force is applied to one particular point of the material than another, there is considerable likelihood that the cell bonding lines adjacent the point where greater force is applied will rupture; and, moreover, it is almost a practical certainty in such instances that the material will expand unevenly and result in a defective or inferior product.

A more particular object of the present invention is to provide an expanding device which incorporates pursable anchoring means adapted to purse inwardly laterally with the web material of the honeycomb block to which it is anchored upon endwise expansion of said block. As will appear more fully hereinafter, by providing pursable anchoring means, the honeycomb block can be expanded uniformly with a minimum of cell distortion.

Numerous other objects and advantages of the present invention will become apparent upon reading the following specification and referring to the accompanying drawings in which similar characters of reference represent corresponding parts in each of the several views.

In the drawings:

Fig. 1 is an enlarged fragmentary view in perspective of a sheet of honeycomb material.

Fig. 2 is a perspective view of a block of unexpanded honeycomb showing fragmentarily expanding equipment embodying the invention secured to opposite ends thereof.

Fig. 3 is a side elevational view of same but showing the said expanding equipment substantially in its entirety.

Figs. 4, 5, 6, and 7 illustrate the mode of operation of expanding equipment embodying the present invention during various sequences of expansion of a block of honeycomb.

Fig. 8 is a perspective view of a pull-bar.

Fig. 9 is a perspective view of a modified pull-bar construction.

Referring now more particularly to the drawings, the letter A designates generally a block or slice of honeycomb, comprising a plurality of individual elongate webs of honeycomb material such as indicated in Fig. 1 at 10, 10a, 10b, and 10c. Adjacent webs are bonded to one another by alternately staggered bonding lines. For example, web 10b is bonded to adjacent web 10a by a number of bonding lines 11, and said web 10b is also bonded to adjoining web 10c by a plurality of bonding lines 11a spaced alternately with respect to bonding lines 11. It is noted that all of the said bonding lines extend in a substantially common direction.

Honeycomb of the type illustrated in the drawings is characterized by its ability to be expanded in an endwise direction—i. e., in a direction normal to the direction in which the bonding lines extend. As will appear more fully hereinafter, upon expansion of a block of honeycomb, the individual webs thereof will purse inwardly causing a general narrowing of the block throughout its length.

The embodiment of the expanding means illustrated in the drawings comprise a pair of identically constructed units, designated generally at B and C, which are adapted for attachment to opposite end-webs of a block of honeycomb to be expanded. Expanding unit B, for example, comprises an elongate, flexible and pursable anchor strip 16 formed of cloth or like material provided with a plurality of spaced pullers, comprising closed loops 17. In the embodiment illustrated, the loops may be formed integrally with the anchor strip material, and the base ends of each loop are preferably joined together by stitching or stapling, as indicated at 18, or by other suitable means such as adhesive or the like.

Each of the loops 17 carries an individually associated tug pin 19, and the opposite ends of each tug pin are adapted for slidable mounting on the trackways of an associated pull-bar. More particularly, Fig. 8 illustrates pull-bar 21 as comprising a base frame 22 supporting hingedly two pairs of track supporting arms indicated at 23—23 and 24—24, respectively. The pair of arms 23—23 support between them opposite ends of trackway 26, and arms 24—24 similarly support a trackway 27 in spaced parallel relationship to trackway 26.

As heretofore mentioned, expanding unit C is constructed similarly to unit B, hereinabove described. Component elements comprising unit C are designated similarly to the corresponding parts comprising unit B, but are suffixed by the letter "a" to distinguish them in the drawings.

In operation, anchor strips 16 and 16a of units B and C are secured adhesively to opposite end-webs of the block of honeycomb to be expanded. More specifically and with particular reference to Figs. 4 through 7, inclusive, one adhesive surface of a strip of double-coated pressure sensitive adhesive tape 28 may be adhesively conformably secured to end-web 29 of honeycomb block A, whereby adhesive engagement between the tape and the web is established substantially throughout the length of the latter. The other adhesive surface of tape 28 is adapted to adhesively secure anchor strip 16 to the block at least throughout the length of end-web 29 thereof. It will suffice to say that anchor strip 16a of expanding unit C is similarly adhesively applied to the opposite end-web of the honeycomb, as shown in Fig. 2.

A particularly satisfactory commercially available type of adhesive tape for securing the anchor strips to the blocks is manufactured by the Minnesota Mining and Mfg. Co. of St. Paul, Minnesota, and is sold commercially as "No. 400 Scotch Tape." This tape comprises a tissue filler coated on both sides with a relatively non-drying, tacky, pressure sensitive rubber-base adhesive. Although tape of this type can be relatively easily "stripped" or "peeled" from a surface to which it has been adhesively applied, it will withstand very considerable "direct pull" before separating from a surface to which it has been applied. During the honeycomb expansion, which will be described more fully hereinafter, the more or less direct pull transmitted to tape 28, for example, via the individual closed loops 17 of associated anchor strip 16 will have relatively little tendency to cause adhesive separation of the tape from the said anchor strip or from end-web 29 of the honeycomb block to which said tape is applied. The loops being closed at their base ends transmit pull to the anchor strip and tape at a plurality of substantially equidistantly spaced points throughout the length of each end-web of honeycomb material being expanded.

Tug pins 19 carried in loops 17 of unit B are slidably supported on trackways 26 and 27 of pull bar 21, and, similarly, tug pins 19a of unit C are slidably mounted on trackways 26a and 27a of pull bar 21a. When expansion forces are applied to the pull bars, the honeycomb block will expand accordingly. For example, one of the pull bars may be secured or anchored to a stationary part of a wall or ceiling and the other of the pull bars can be pulled in a direction away therefrom, either manually or by suitable mechanical means (not shown). Figs. 4, 5, 6, and 7 disclose how the individual cells of the material gradually enlarge and assume their ultimate substantially hexagonal shape upon expansion of the block. These drawings also illustrate how the individual webs of the honeycomb, such as end-web 29, tend to purse inwardly laterally upon expansion of the material with resultant narrowing of the block throughout substantially its entire length. In view of the fact that both the anchor strips 16 and 16a and the adhesive tapes securing said strips to opposite end webs of the honeycomb are pursable, the said anchor strips will purse inwardly in conformable adhesive engagement with their respectively associated end-webs, thereby allowing the block ends to narrow. Moreover, the tug pins being mounted slidably on associated trackways of the pull bars are free to move slidably toward one another substantially proportionately to the amount of inward pursing of the anchor strips. It is important to note that if the anchor strips were not allowed to purse inwardly and/or if some means were not provided for the pullers (comprising the loops and tug pins) to move closer together with the pursing of the anchor strips, the expansion of the honeycomb block would be uneven and non-uniform. In short, unless the anchored ends of the block are allowed to narrow proportionately to the rest of the block, enlargement of the cells adjacent the ends of the block will not be nearly as great as the cellular enlargement that will occur throughout the intermediate portions of the material.

For purposes of simplicity of explanation and illustration of the principles and mode of operation of the present invention, the drawings illustrate each of the anchoring strips as being provided with loops corresponding in number to the number of cells defined by the respective end-web of the block to which said strip is anchored adhesively. In short, the drawings show one loop directly associated with the node of an adjacent end cell. Actually this constitutes a near ideal arrangement as a minimum of distortion in cell shapes will occur upon expansion of the honeycomb under such arrangement. It is to be noted, however, that in actual practice of the present invention, extremely satisfactory results can be obtained without particular regard to the relation between the number of loops per number of cells. Generally speaking, satisfactory results will accrue if the loops are spaced reasonably close together and the adhesive employed to secure the anchor strips to the blocks is sufficiently tacky to maintain a secure bond between the anchor strips and block. In many instances one loop per every two or three cells is adequate for all practical purposes, although the expansion of the cells adjacent the ends of the block of honeycomb will not, in such instances, be as uniform as the near ideal arrangement illustrated in the drawings and discussed above. However, experience has shown that the relatively slight distortion of the cells adjacent the ends of the honeycomb block which may occur will not affect materially the practical or commercial worth of material so expanded.

In Fig. 9 of the drawings, there is illustrated a modified pull-bar construction. This construction differs from the prior pull-bar structure hereinabove described principally in the formation of its trackways. More particularly, it is seen that a pair of bowed or curved parallel trackways 26a and 27a are substituted for the straight trackways 26 and 27 incorporated in the first described embodiment. It will be readily understood that the bowed trackways 26a and 27a will permit tug pins slidably carried thereon, such as indicated at 119, to more readily bunch toward one another during expanding operations to compensate for the resultant pursing and narrowing of the honeycomb block being expanded, as above described.

By supporting the trackways on hinged arms, such as arms 23—23 and 24—24 hereinabove mentioned, the trackways may be spread apart from one another to facilitate positioning of the tug pins thereon, and/or removal of the tug pins therefrom.

Unexpanded sheets or blocks of cellular material of the character herein mentioned may be produced in various shapes and sizes, and other than as flat rectangular pieces of uniform thickness (such as have been shown in the drawings for purposes of convenient explanation). The present invention may be employed to excellent advantage in the expansion of tapered, curved and/or other variously shaped and configured pieces of unexpanded honeycomb and like cellular material, and the term "block," as used herein and in the claims, includes all shapes and forms of such cellular material to be expanded.

Although the present invention has been described in some detail by way of illustration and example for purposes of clarity of understanding, it is understood that certain changes and modifications may be made within the spirit of the invention and scope of the appended claims.

We claim:

1. Means for expanding a block of unexpanded cellular material of the type characterized by its ability to be expanded in an endwise direction with resultant tendency of the webs of cellular material to purse inwardly laterally to cause a narrowing of the expanding block throughout its length, comprising; anchoring elements attachable to one end of said block, said elements movable toward one another for allowing narrowing of the blocks at the end thereof to which said elments are attached upon endwise movement and expansion of said block.

2. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; a pursable anchor strip, means for attaching said anchor strip pursably to an end web of a block of unexpanded cellular material adopted to be expanded, and individual pullers provided on said anchor strip at spaced intervals lengthwise thereof through which pull can be transmitted to said anchor strip and the end web of said block.

3. A combination according to claim 2 and wherein said individual pullers comprise a plurality of spaced, closed loops secured to and projecting outwardly from one surface of said anchor strip.

4. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; a pursable anchor strip, means for attaching adhesively and pursably said anchor strip to an end web of a block of unexpanded cellular material adapted to be expanded, a plurality of individual pullers comprising individual loops joined to said anchor strip at spaced intervals lengthwise thereof, and a plurality of tug elements individually engageable in said loops through which pull can be transmitted via said loops to said anchor strip and the end web of said block.

5. Means according to claim 4 and wherein said means for adhesively securing said anchor strip to an end web of a block of cellular material comprises a length of flexible and pursable double-coated, normally tacky, pressure sensitive adhesive tape having one of its adhesive faces adapted for adhesive securing to said anchor strip and the other of its adhesive faces adapted for adhesive securing to a said end web.

6. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; a relatively flat elongate pursable anchor strip, a plurality of closed loops provided at spaced intervals lengthwise of said strip and projecting outwardly from one surface thereof, the base ends of each loop joined together and joined to the said anchor strip proximate said point of joinder between said base ends, adhesive means to attach pursably said anchor strip to an end web of a block of cellular material adapted to be expanded, and a plurality of tug elements individually engageable in said loops through which pull may be transmitted via said loops to said anchor strip and the end web of said block.

7. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; a relatively flat elongate flexible and pursable anchor strip, a plurality of closed loops provided at spaced intervals lengthwise of said strip and projecting outwardly from one surface thereof, the base ends of each loop joined together and joined to said anchor strip proximate said point of joinder between said base ends, adhesive means to attach pursably said anchor strip to an end web of a block of cellular material adapted to be expanded, a plurality of tug elements individually engageable in said loops through which pull may be transmitted via said anchor strip to said end web of said block, and a pull bar comprising members for supporting slidably said tug elements for slidable movement toward and away from one another.

8. Means according to claim 7, and wherein said tug elements comprise tug pins projecting through said loops, and wherein said pull bar members comprise a pair of spaced parallel trackways for supporting slidably between them opposite ends of each of the tug pins.

9. Means for expanding an unexpanded block of cellular material characterized by its ability to be expanded in an endwise direction with the resultant tendency of the webs of cellular material to purse inwardly laterally to cause a narrowing of the expanding block throughout substantially its entire length, comprising; a relatively flat elongate flexible and pursable anchor strip, a plurality of spaced loops provided at spaced intervals lengthwise of said strip and projecting outwardly from one surface thereof, the base ends of each said loop joined together and joined to said anchor strip proximate said point of joinder between said base ends, a length of double-coated normally tacky flexible and pursable adhesive tape, one adhesive surface of said tape secured adhesively conformably to said anchor strip throughout the length of said strip, the other adhesive surface of said tape adapted for adhesive securing to an end web of a block of unexpanded cellular material adapted to be expanded, a plurality of tug elements individually engageable in said loops through which pull may be transmitted via said anchor strip to said end web of said block, and a pull bar comprising members for supporting slidably said tug elements for slidable movement toward and away from one another.

10. Means according to claim 9 and wherein said tug elements comprise tug pins projecting through said loops, and wherein said pull bar members comprise a pair of spaced parallel trackways for supporting slidably between them opposite ends of each of the tug pins.

11. Means according to claim 9 and wherein said tug elements comprise tug pins projecting through said loops, and wherein said pull bar members comprise a pair of spaced bowed parallel trackways for supporting slidably between them opposite ends of each of the tug pins.

12. In cellular material expanding equipment of the type comprising an anchor strip provided with pullers and having tug pins associated with and carried by said pullers, a pull bar construction to support slidably said tug pins, comprising; a frame, and a pair of spaced, parallel trackways mounted on said frame for supporting slidably between them opposite ends of each tug pin.

13. A pull bar according to claim 12 and wherein said trackways are mounted on said frame relatively movably toward and away from one another.

14. In cellular material expanding equipment of the type comprising an anchor strip provided with pullers and having tug pins associated with and carried by said pullers, a pull bar construction to support slidably said tug pins, comprising; a frame, and a pair of correspondingly bowed, spaced parallel trackways mounted on said frame for supporting slidably between them opposite ends of each tug pin.

15. In equipment for expanding a block of unexpanded cellular material of the type characterized by its ability to be expanded in an endwise direction with the resultant tendency of the webs of cellular material to purse inwardly laterally to cause a narrowing of the expanding block throughout its length, comprising: an anchor strip for securing to an end web of a said block to be expanded, said anchor strip comprising an elongate strip of pursable material, and a plurality of spaced pullers joined to said anchor strip and projecting outwardly from one surface thereof through which pull may be transmitted to said anchor strip.

16. An anchor strip according to claim 14 and wherein said pullers comprise closed loops having their base ends joined together, and wherein each said loop is joined to said anchor strip proximate said point of joinder between its base ends.

17. A method of expanding an unexpanded block of honeycomb of the type having its cell bonding lines extending in a substantially common direction and further characterized by its ability to be expanded endwise in a direction substantially normal to said bonding lines with resultant tendency of the individual webs of honeycomb material to purse inwardly laterally to cause a general narrowing of the block throughout its length comprising the steps of: securing a first pursable anchor strip to a first end web of a said block of honeycomb throughout substantially the entire length of said web, securing a second pursable anchor strip to the opposite end web of said block of honeycomb throughout substantially the entire length of said web, applying force to said first anchor strip at a plurality of substantially equidistantly spaced points throughout the length of said first end web of said block in a direction endwise of said block and away from the second end of said block, and while applying said force restraining said second anchor strip and the second end web secured to said second anchor strip against movement in the direction of said applied force.

18. A method of expanding an unexpanded block of honeycomb of the type having its cell bonding lines extending in a substantially common direction and further characterized by its ability to be expanded endwise in a direction substantially normal to said bonding lines with resultant tendency of the individual webs of honeycomb material to purse inwardly laterally to cause a general narrowing of the block throughout its length comprising the steps of: securing adhesively a first pursable anchor strip to a first end web of a said block of honeycomb throughout substantially the entire length of said web, securing adhesively a second pursable anchor strip to the opposite end web of said block of honeycomb throughout substantially the entire length of said web, applying force to said first anchor strip at a plurality of substantially equidistantly spaced points throughout the length of said first end web of said block in a direction endwise of said block and away from the second end web of said block, and while applying said force restraining said second anchor strip and the second end web secured to said second anchor strip against movement in the direction of said applied force.

19. Means for expanding a block of unexpanded cellular material of the type characterized by its ability to be expanded in an endwise direction with resultant tendency of the webs of cellular material to purse inwardly laterally to cause a narrowing of the expanding block throughout substantially its entire length, comprising; first and second anchoring means attachable to opposite ends of said block, said first and second anchoring means comprising first and second movable means to allow narrowing of the block at its opposite ends upon endwise expansion of said block.

20. Means for expanding a block of unexpanded cellular material of the type characterized by its ability to be expanded in an endwise direction with resultant tendency of the webs of cellular material to purse inwardly laterally to cause a narrowing of the expanding block throughout its length, comprising; anchoring elements attachable to a first end of said block movable toward one another for allowing narrowing of the first end of said block upon endwise expansion of said block, and anchoring elements attachable to the second end of said block movable toward one another for allowing narrowing of the block adjacent its second end upon endwise expansion of said block.

21. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; first and second pursable anchor strips, means for attaching said first and second anchor strips pursably to opposite end webs of a block of unexpanded cellular material adapted to be expanded, and individual pullers provided on each said first and second anchor strips at spaced intervals lengthwise thereof through which pull can be transmitted to each said anchor strip and its associated end web of said block.

22. A combination according to claim 21 and wherein said individual pullers comprise a plurality of spaced, closed loops secured to and projecting outwardly from one surface of each said anchor strip.

23. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; first and second pursable anchor strips, means for attaching adhesively and pursably said anchor strips to opposite end webs of a block of unexpanded cellular material adapted to be expanded, a plurality of individual pullers comprising individual loops joined to each said anchor strip at spaced intervals lengthwise thereof, and a plurality of tug elements individually engageable in said loops through which pull can be transmitted via said loops to each said anchor strip and its associated end web of said block.

24. Means according to claim 23 and wherein said means for adhesively securing said anchor strips to an end web of a block of cellular material comprises a length of flexible and pursable double-coated, normally tacky, pressure sensitive adhesive tape having one of its adhesive faces adapted for adhesive securing to each said anchor strip and the other of its adhesive faces adapted for adhesive securing to an associated end web of said block.

25. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; first and second relatively flat elongate pursable anchor strips, a plurality of closed loops provided at spaced intervals lengthwise of each said strip and projecting outwardly from one surface thereof, the base ends of each loop joined together and joined to its associated anchor strip proximate said point of joinder between said base ends, adhesive means to attach pursably said first and second anchor strips to opposite end webs of a block of cellular material adapted to be expanded, and a plurality of tug elements individually engageable in the said loops of each anchor strip through which pull may be transmitted via said loops to each said anchor strip and opposite end webs of said block.

26. Means for expanding an unexpanded block of expandable cellular material of the type characterized by its ability to be expanded in an endwise direction with resultant tendency of the webs of cellular material to purse inwardly laterally to cause a narrowing of the expanding block throughout its length, comprising; first and second relatively flat elongate pursable anchor strips, a plurality of closed loops provided at spaced intervals lengthwise of each said strip and projecting outwardly from one surface thereof, the base ends of each loop joined together and joined to its associated anchor strip proximate said point of joinder between said base ends, and adhesive means to attach pursably said first and second anchor strips to opposite end webs of a block of cellular material adapted to be expanded, and first and second pull bars each comprising members for supporting slidably associated tug elements relatively toward and away from one another adjacent opposite ends of the block of cellular material adapted to be expanded.

27. Means according to claim 26 and wherein said tug elements comprise tug pins projecting through said loops, and wherein the said members of each pull bar comprise a pair of spaced parallel trackways for supporting slidably between them opposite ends of the tug pins.

28. Means for expanding an unexpanded block of cellular material characterized by its ability to be expanded in an endwise direction with the resultant tendency of the webs of cellular material to purse inwardly laterally to cause a narrowing of the expanding block throughout substantially its entire length, comprising; first and second relatively flat elongate flexible and pursable anchor strips, a plurality of closed loops provided at spaced intervals lengthwise of each said strip and projecting outwardly from one surface thereof, the base ends of each said loop joined together and joined to an associated anchor strip proximate said point of joinder between said base ends, first and second lengths of double-coated, normally tacky, flexible and pursable adhesive tape, one adhesive surface of each tape adapted to be secured adhesively conformably to an associated anchor strip throughout the length of said strip, the other adhesive surface of each tape adapted for adhesive securing to an associated end web of a block of unexpanded cellular material adapted to be expanded, a plurality of tug elements individually engageable in said loops of each strip through which pull may be transmitted via said anchor strips to opposite end webs of said block, and first and second pull bars each comprising members for supporting slidably associated tug elements relatively toward and away from one another adjacent opposite ends of said block of cellular material.

29. Means according to claim 28 and wherein said tug elements comprise tug pins projecting through said loops, and wherein said members of each pull bar comprise a pair of spaced, parallel trackways for supporting slidably between them opposite ends of the tug pins.

30. Means according to claim 28 and wherein said tug elements comprise tug pins projecting through said loops, and wherein the said members of each pull bar comprise a pair of spaced bowed parallel trackways for supporting slidably between them opposite ends of the tug pins.

References Cited in the file of this patent

UNITED STATES PATENTS

| Number | Name | Date |
|---|---|---|
| 2,305,853 | Eger et al. | Dec. 22, 1942 |
| 2,314,318 | Cunningham | Mar. 16, 1943 |
| 2,345,232 | Boushelle | Mar. 28, 1944 |
| 2,429,177 | Young | Oct. 14, 1947 |
| 2,525,003 | Smith | Oct. 10, 1950 |
| 2,581,421 | Lombard et al. | Jan. 8, 1952 |
| 2,608,502 | Merriman | Aug. 26, 1952 |
| 2,622,999 | Faussner | Dec. 23, 1952 |